Aug. 6, 1968  C. M. KELLY ET AL  3,396,400

RADAR TRANSPARENT COVERING

Filed March 30, 1965

INVENTORS.
CHARLES M. KELLY
BERNARD D. RAFFEL

ATTORNEY

3,396,400
RADAR TRANSPARENT COVERING
Charles M. Kelly and Bernard D. Raffel, Akron, Ohio, assignors to Goodyear Aerospace Corporation, Akron, Ohio, a corporation of Delaware
Filed Mar. 30, 1965, Ser. No. 443,981
2 Claims. (Cl. 343—872)

ABSTRACT OF THE DISCLOSURE

A covering which will reflect infra-red, visible, and ultra-violet waves and allow the passage of selected high frequency electromagnetic waves within the radar bands which might be utilized for covering any area where it is desired to utilize these characteristics of the material, such as radomes and wave guides. This is accomplished by utilizing a lightweight thin metallic coating which acts like a mirror, but which is divided into a plurality of geometrically similar electrically disconnected areas appropriately arranged to allow passage of the desired electromagnetic waves.

---

This invention relates to radomes and the like, and more particularly, is concerned with improvements thereto in the form of coatings which will reflect infra-red, visible, and ultra-violet waves but allow the passage of selected high frequency electromagnetic waves within the radar bands.

This invention is an extension of and an improvement to our Patent No. 3,082,510 of Mar. 26, 1963. Particularly, the improvements of this patent reside in being able to more accurately control the band of high frequency electromagnetic waves which will be passed by the coating to provide a higher degree of certainty and controlled operation to the radar. Further, in some cases, such as wave guides and rigidized structures it is impossible to use the fractured type of transparent coatings set forth in the above cited patent.

Accordingly, the general object of the invention is the provision of the relatively simple, inexpensive, easily applied coatings or coverings for radomes, aircrafts, blimps, balloons, space vehicles and the like which coatings are transparent to certain electromagnetic radar waves, but highly reflective to higher frequency waves in the infrared, visible, and ultra-violet range.

Another object of the invention is to provide a radome, or the like for earth or space applications, which is kept cool by reflecting the sun's rays but which will freely pass radar waves of pre-determined wave lengths.

The aforesaid objects of the invention, and other objects which will become apparent as the description proceeds are achieved by the combination in a radome of a dome-like supporting structure which is transparent to high frequency electromagnnetic waves within the radar bands and higher frequency infra-red waves, or thin covering of polyester film for the supporting structure within the range of from about ¼-mil to about 10 mils thick, adhesive means securing the film to the structure, and a coating of vaporized aluminum on the outer surface of the film, the coating being broken into a plurality of substantially electrically disconnected geometrically similar particles allowing the passage of a pre-selected range of high frequency waves within the radar bands, but reflecting the still higher frequency infra-red waves.

For a better understanding of the invention reference should be had to the accompanying drawings, wherein.

Figure 1:
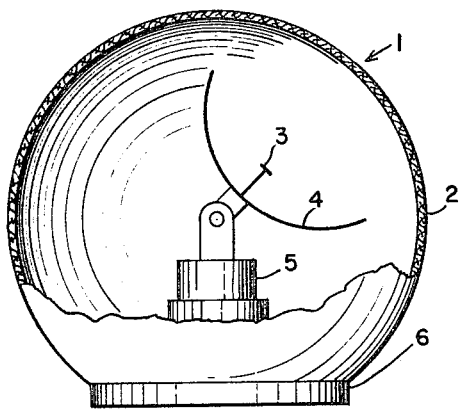
FIGURE 1 is a side elevation, partly broken away, of a radar and radome structure to which the invention is applied.

With reference to FIGURE 1 of the drawings, the numeral 1 indicates generally a radar having a radome 2, an antenna 3, a reflector 4 and suitable support and driving mechanism 5, all mounted on a base 6.

Figures 2, 3, 4:
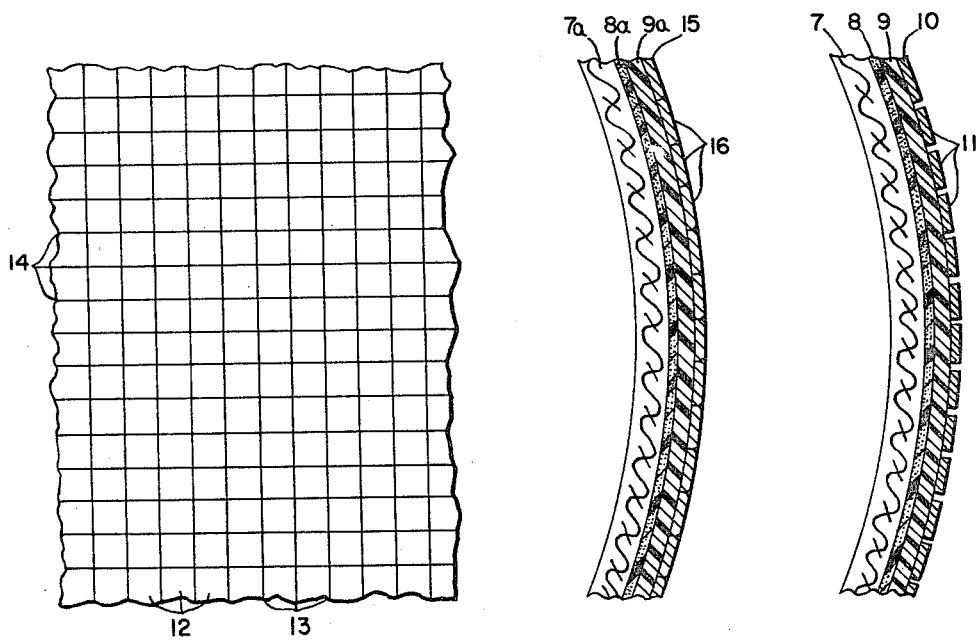
FIGURE 2 is an enlarged cross-sectional view of the wall of the radome of FIGURE 1 utilizing a coating comprising one embodiment of the invention.
FIGURE 3 is an enlarged cross-sectional view of the wall of the radome of FIGURE 1 utilizing a coating comprising embodiment of the invention.
FIGURE 4 is a plan view of the electrically interrupted metal coating of either FIGURE 2 or FIGURE 3.

FIGURE 2 illustrates in greater detail the cross sectional appearance of the radome 2 as including a supporting structure 7, an adhesive layer 8 securing a covering of plastic film 9 to the supporting radar bands and a thin covering of structure 7, and with an outside coating of a relatively thin metal, indicated generally by the numeral 10, which is composed of a plurality of individual metal sections 11.

The supporting structure 7 may take a variety of forms as long as it is transparent to high frequency, electromagnetic waves in the radar band range. The structure 7 may or may not be reflective to infra-red waves although it generally will pass infra-red waves. A typical supporting structure is rubberized or plastic treated fabric which may be gas tight and which is inflated internally. However, the invention contemplates that the coating 10 will also be used on a rigid, non-expansible base, such as a slotted wave guide or a rigid radome.

The plastic film 9 is any strong, chemically stable material not becoming too soft or too brittle from a wide range of temperatures and likewise transparent to radar waves, and usually transparent to infra-red, visible, and ultra-violet waves. A typical suitable material is a polyester film sold by E. I. du Pont de Nemours and Co. under the trademark "Mylar." This film has a thickness of from about ¼ to about 10 mils, good stability within temperature ranges of −60° C. to 150° C. and a tensile strength of 20,000 p.s.i.

The relatively thin coating of metal 10 is selected from the group including aluminum, nickel, gold, silver, platinum, stainless steel, tin, or alloys thereof which provide a bright reflective surface. The metal coating 10 may be deposited on the film 9 in a plurality of ways, but one convenient manner is to use a vaporization technique to give a very thin mirror-like coating.

When the coating 10 is continuous it becomes substantially non-transparent to both radar and infra-red waves. However, if the coating 10 is broken into a plurality of relatively small substantially electrically disconnected areas, such as sections 11, then while still non-transparent to infra-red, visible, and ultra-violet waves the coating becomes transparent to radar waves. Extensive testing showed this transparency to radar waves to be dependent upon the frequency, to the center to center spacing of the section 11, and to the percent area of the plastic film 9 covered by the metal coating 10. A control of the variables of the center to center spacing, and the percent area of the plastic film 9 covered by the metal coating 10 can effectively control the frequency of radar waves which are passed by the coating 10. The surface area of the sections 11 can vary between about ⅟₅₀₀ to about ½ square inch with greater control and conductivity of the radar waves being apparent as the surface area of the sections 11 is decreased. Thus, it becomes rapidly apparent that the coating 10 may be designed to pass radar waves of certain wave lengths while reflecting radar waves of undesired wave lengths. In radar operation this becomes an extremely important asset, particularly, where a radar may be set up for the sole purpose of receiving electromagnetic signals of a particular frequency and it is desired to screen out all other frequencies.

Also, it has been found that essentially the same amount of reflection of infra-red, visible, and ultra-violet waves and passing of selected electromagnetic waves has been achieved even where the metal volume comprises up to 90% of the total volume of the film 9. A metal volume of between about 50% to about 90% of the total film volume has been found desirable. Thus, it becomes obvious that radomes and wave guides having great strength can be constructed utilizing the principles of the invention, which will still transmit or be transparent to electromagnetic radar waves.

One possible configuration for the geometrically similar particles 11 could be squares, as indicated by the squares 12 in FIGURE 4. The squares 11 must be electrically disconnected. However, it should be recognized that any geometrically similar particles could be used. The surface area described by the similar squares 12 will pass electromagnetic waves that are very large in comparison to the square size.

In one particular instance, an unusual result in the degree of control available has occurred. This results where electromagnetic waves have their electric field vector, known as the E vector, aligned in known directions. It has been found that E-vectors which are directed parallel to either the horizontal axes 13 or the vertical axes 14 described by the squares 12 in FIGURE 4 will pass therethrough. However, any electromagnetic wave not having its E vector substantially parallel to either the axes 13 or 14 will be reflected by the squares 12. Thus, it is seen that the squares 12 could be made of any similar geometric figures such as triangles, parallelograms, pentagons, etc., to dictate the E vector which they will pass to effect further control to the electromagnetic transmissivity of the metallic coating.

FIGURE 3 is an illustration of another embodiment of the invention which includes a supporting structure 7a, an adhesive layer 8a secures a covering of plastic film 9a to the supporting structure 7a, and in this case a layer of thin metal 14 is secured to the film 9a. The metal layer 14 is broken into a plurality of geometrically similar, relatively small substantially electrically disconnected areas 16 which are not actually individual segments such as the segments 11 in FIGURE 2. Rather, the areas 16 are formed in the film 15 by scribing or passing the metal layer 15 through a pair of rolls where one roll has a knurled outer surface to provide the proper impression on the outer surface of the metal layer 15 and effectively divide it into a plurality of areas 16.

Thus, some of the typical methods for forming the outer metal layer into a plurality of electrically separated areas is to utilize scribing, knurled rolls, conventional acid etching techniques or simply utilizing a plurality of separate areas properly and uniformly positioned on the backing film.

Again, it should be stressed that this type of electromagnetic transparent film may be best utilized on wave guides or other rigid type structures where a crumpling technique as set forth in our patent cited above may not be practical or desired. Further, a much greater degree of control of the electromagnetic wave transmission is achieved utilizing the uniform segmented areas of this application as compared with the random areas achieved by the crumpling technique.

Uses of the structure of the invention on wave guides, spacecraft blimps, ballons, radomes, and the like, allows radar and radio transmission reception, but keeps out the heat of infra-red waves which are objectionable from the standpoint of operator comfort, gas, temperature uniformity, or the like.

While a certain representative embodiment and details have been shown for the purpose of illustrating the invention, it will be apparent to those skilled in this art that various changes and modifications may be made therein without departing from the spirit or scope of the invention.

What is claimed is:
1. In a radar transparent covering the combination of
   a dome-like rigid and inextensible supporting structure which is transparent to high frequency electromagnetic waves within the radar bands and infra-red radiation,
   a thin covering of polyester film of between ¼ to 10 mils for the supporting structure,
   means securing the film to the structure, and
   a coating of thin light weight metal on the outer surface of said film, said coating having a metal volume being about 50% to about 90% of the total film volume, said coating comprising a plurality of substantially electrically disconnected geometrically similar areas describing a plurality of parallel axes thereby allowing the passage of a selected range of high frequency electromagnetic waves having their E-vectors parallel to said axes, but reflecting the higher frequency infra-red waves.

2. A mirror which comprises a supporting structure transparent to both high frequency electromagnetic waves within the radar bands and higher frequency infra-red waves, a thin covering of plastic film for the supporting structure secured to the structure, and a thin coating of light reflective metal vapor deposited onto the entire outer surface of the film which in deposited condition is opaque in both electromagnetic waves and infra-red waves, said coating being knurled to a plurality of geometrically similar areas describing a plurality of parallel axes, and where the knurling substantially electrically disconnects the areas from each other allowing the passage of a selected range of high frequency electromagnetic waves having their E-vectors parallel to said axes.

References Cited
UNITED STATES PATENTS

| | | | |
|---|---|---|---|
| 3,025,515 | 3/1962 | Fairbanks | 343—840 |
| 3,082,510 | 3/1963 | Kelly et al. | 343—872 |
| 3,165,749 | 1/1965 | Cushner | 343—909 |
| 3,231,892 | 1/1966 | Matson et al. | 343—912 |

ELI LIEBERMAN, *Primary Examiner.*